OSCILLATOR DRIVING A RESONANT CIRCUIT WITH A SQUARE WAVE AND HAVING NEGATIVE FEEDBACK

Filed Sept. 17, 1964

INVENTOR
ROBERT ORDOWER

BY John C Black
ATTORNEY

United States Patent Office 3,276,032

Patented Sept. 27, 1966

3,276,032
OSCILLATOR DRIVING A RESONANT CIRCUIT WITH A SQUARE WAVE AND HAVING NEGATIVE FEEDBACK

Robert Ordower, Vestal, N.Y., assignor to International Business Machines Corporation, New York, N.Y., a corporation of New York Filed Sept. 17, 1964, Ser. No. 397,222
3 Claims. (Cl. 346—74)

Figure 1:
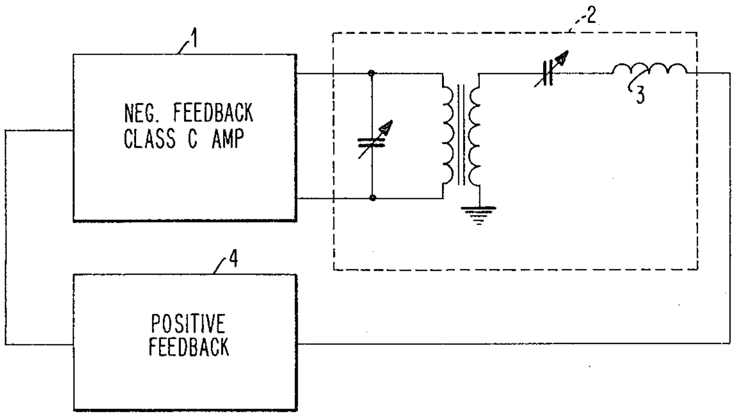

This invention relates to an improved astable signal generating circuit.

A preferred embodiment of the improved circuit has been particularly designed to drive the magnetic write head of magnetic character reader-sorter equipment or the like; it will be appreciated, however, that the invention is to be limited only by a scope of the appended claims.

In this art certain troublesome problems have been experienced in the driver circuits. Known drivers have been unduly costly and operation has not been sufficiently stable. They have been characterized by excessive power dissipation in relation to the relatively high power output The preferred embodiment has been adapted for supplying 250 milliamperes of sinusoidal current to a write head at a 19.5 kilocycle rate.

Accordingly, it is a primary object of the present invention to provide an improved astable signal generator which is low in cost and which is characterized by a minimum number of components, inexpensive transistors, and a significant reduction in circuit power dissipation relative to the required power output.

Another object of the present invention is the provision of a magnetic write head driver circuit of the type described in the preceding object, wherein the magnetic head is used as one of the tuning elements of the signal generator and appears within the overall feedback loop.

Another object of the present invention is the provision of an astable signal generator characterized by a negative feedback amplifier operated Class C within an overall positive feedback loop.

These objects are achieved in a preferred embodiment of the present invention by means of a Class C negative feedback amplifier, a resonant circuit tuned to a desired frequency and energized by the amplifier, wherein the magnetic write head is used as one of the tuning elements in the resonant circuit and appears within a positive feedback loop from the resonant circuit to the input of the amplifier. The amplifier is characterized by a first transistor amplifier operated Class A, a second common emitter transistor amplifier operated between cutoff and saturation by the output of the first amplifier, and a third transistor amplifier operated between cutoff and saturation in response to the output of the second amplifier. A negative feedback is provided between the output of the second amplifier and the input of the first amplifier. The resonant circuit is connected to the output of the third amplifier. The second amplifier provides a square wave output which lends extreme flexibility to the improved circuit, i.e., either or both the square wave and a sine wave output can be derived from the same circuit with a high degree of circuit stability.

The foregoing and other objects, features and advantages of the invention will be apparent from the following more particular description of a preferred embodiment of the invention, as illustrated in the accompanying drawings.

Figure 2:
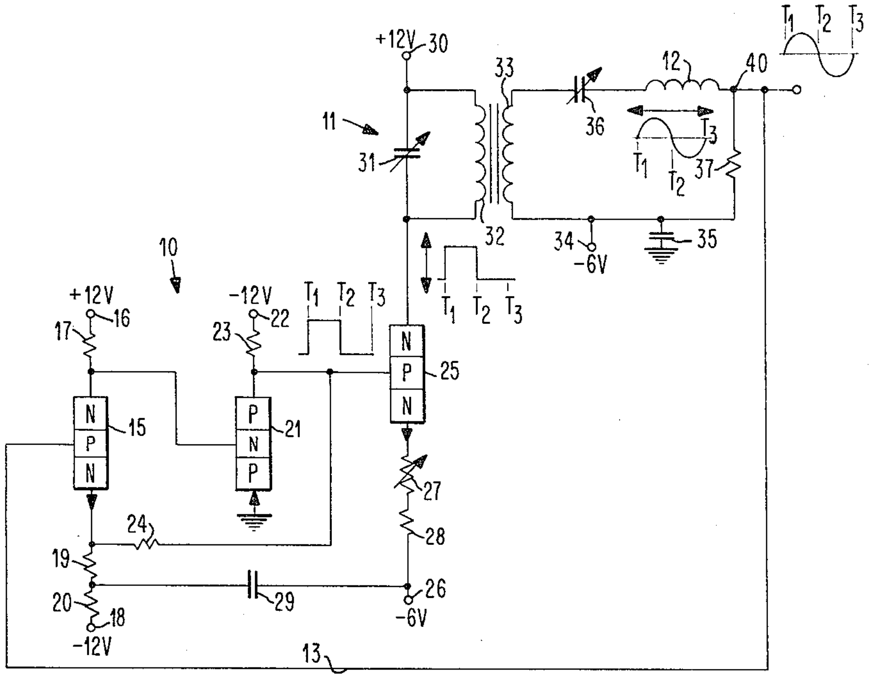

In the drawings:

FIG. 1 is a diagrammatic illustration of the improved astable signal generating circuit; and FIG. 2 is a schematic diagram of a preferred embodiment of the improved signal generator.

The improved signal generator illustrated diagrammatically in FIG. 1 includes a negative feedback Class C amplifier 1, a resonant circuit 2 connected to the output of the amplifier 1 and including a magnetic write head 3 and a positive feedback circuit 4 coupling the tuned resonant circuit 2 to the input of the amplifier 1.

The preferred embodiment of the improved signal generator illustrated diagrammatically in FIG. 1 includes a negative feedback Class C amplifier 10, a resonant circuit 11, including a magnetic write head 12, and a positive feedback conductor 13 connected between the tuned circuit 11 and the input to the amplifier 10.

The amplifier 10 includes a first transistor 15 having its collector electrode connected to a positive bias supply terminal 16 by way of a resistor 17 and its emitter electrode connected to a negative bias supply terminal 18 by way of a voltage divider comprising resistors 19 and 20.

The amplifier 10 includes a second transistor 21 having its base electrode connected to the collector electrode of the transistor 15, its emitter electrode connected to ground potential, and its collector electrode connected to a negative bias supply terminal 22 by way of a resistor 23. The collector electrode of the transistor 21 also is connected to the emitter electrode of the transistor 15 by way of a negative feedback resistor 24.

The amplifier 10 includes a third transistor 25 having its base electrode connected to the collector electrode of the transistor 21, its emitter electrode connected to a negative bias supply terminal 26 by way of a potentiometer 27 and a resistor 28. A capacitor 29 couples the negative bias supply terminal 26 to the junction between the resistors 19 and 20. The collector electrode of the transistor 25 is connected to a positive bias supply terminal 30 by way of the parallel connected variable capacitor 31 and primary winding 32 of a coupling transformer. The transformer includes a secondary winding 33 having one terminal connected to a negative bias supply terminal 34 and to ground potential by way of a capacitor 35 and its other terminal connected to the terminal 34 by way of a variable capacitor 36, the magnetic write head 12 and a resistor 37. The conductor 13 couples the junction 40 between the magnetic head 12 and the resistor 37 to the base electrode of the transistor 15.

When power to the circuit of FIG. 2 is turned on, the negative feedback stage comprising the transistors 15 and 21, the resistors 17, 19, 20, 23 and 24 and the capacitor 29 acts as a linear amplifier, Class A operation. The voltage at the collector of the transistor 21 is between −6 volts and ground potential, so that the transistor 25 is forward biased. At this time, all of the transistors are operating Class A which results in a loop gain greater than 1 causing oscillations to build up. The circuit is therefore self-starting.

It will be assumed that the potentiometer 27 has been adjusted so that the current through the magnetic head 12 is at its desired value, for example, 250 milliamperes. It will be further assumed that the capacitors C1 and C2 have been adjusted to tune the resonant circuit to the desired frequency, for example, 19.5 kilocycles.

Once the oscillations have built up to a point at which the circuit exhibits stabilized operation, the transistors 21 and 25 operate Class C, rather than Class A. Assume that the sine wave signal at the junction 40 begins to go positive. This positive signal is applied to the base electrode of the transistor 15 which causes the collector electrode of the transistor 15 to go negative. The high gain of the negative feedback amplifier stage causes the transistor 21 to rapidly switch from cutoff to saturation. The collector electrode of the transistor 21 rapidly varies from the negative potential at the terminal 22 to ground potential to rapidly switch the transistor 25 from cutoff to an operating point which supplies the desired value of collector current to the resonant circuit 11. This square wave of current is applied to the resonant circuit. The high Q of this circuit results in a sinusoidal current through the magnetic head in a positive going direction.

When the current through the magnetic head reaches its maximum positive value, the value of the current begins to reduce. When the voltage at the junction 40 goes negative, the potential at the collector of the transistor 15 together with the high gain of the negative amplifier stage rapidly switches the transistor 21 from saturation to cutoff; this in turn rapidly cuts off the transistor 25 to complete one cycle of operation.

As indicated above, the sine wave output of the signal generator may be used by a utilization device other than a magnetic write head; and square wave signals may be derived from the collector electrode of the transistor 21.

One circuit of the type illustrated in FIG. 2 which exhibited a high degree of reliability and stability utilized components having the values set forth below; it will be appreciated, however, that these values are given by way of example and are not to be construed as limiting the invention.

| | | Values |
|---|---|---|
| Resistors **17** | ohms | 3000 |
| Resistors **19** | do | 51 |
| Resistors **20** | do | 953 |
| Resistors **23** | do | 1000 |
| Resistors **24** | do | 1800 |
| Resistors **27** | ohm potentiometer | 100 |
| Resistors **28** | ohms | 10 |
| Resistors **37** | do | 5 |
| Capacitors **29** | microfarads | 10 |
| Capacitors **31** | do | .011 |
| Capacitors **35** | do | 10 |
| Capacitors **36** | do | .0033 |
| Magnetic head **12** | millihenries | 5 |

While the invention has been particularly shown and described with reference to a preferred embodiment thereof, it will be understood by those skilled in the art that various changes in form and details may be made therein without departing from the spirit and scope of the invention.

What is claimed is:

1. An astable drive circuit for the magnetic write head of magnetic character reader-sorter apparatus, said circuit comprising

- a first inverting transistor amplifier operated class A during stable operation of the drive circuit and having a first output;
- a common emitter transistor amplifier having a second output and operated between cutoff and saturation during stable operation of the drive circuit in response to signals at the first output;
- means providing negative feedback between the second output and the first amplifier;
- a third common emitter transistor amplifier having an output circuit connected to the resonant circuit and operated between cutoff and saturation during stable operation of the oscillator in response to signals at the second output;
- a resonant circuit including
- a first capacitor and the primary winding of a transformer connected in parallel in the output circuit of the third amplifier and tuned to a desired frequency, and
- a second capacitor, the secondary winding of said transformer and said write head connected in series and tuned to the desired frequency; and
- means providing positive feedback between the resonant circuit and the first amplifier.

2. The combination set forth in claim 1 wherein the values of capacitors are adjustable to operate the resonant circuit at the desired frequency.

3. The combination set forth in claim 1 wherein the drive circuit produce a sinusoidal signal in the write head at a current level in the order of two hundred fifty milliamperes at a frequency in the order of nineteen thousand five hundred cycles per second.

References Cited by the Examiner

UNITED STATES PATENTS

| | | | |
|---|---|---|---|
| 1,850,580 | 3/1932 | Coram | 331—156 |
| 2,478,330 | 8/1949 | Shonnard | 331—156 |
| 3,116,466 | 12/1963 | Grib | 331—116 |

ROY LAKE, *Primary Examiner.*

J. KOMINSKI, *Assistant Examiner.*